United States Patent
Kreitzer et al.

Patent Number: 5,809,016
Date of Patent: Sep. 15, 1998

[54] SELECTIVE CALL RECEIVER AND METHOD OF PROCESSING DIVERSITY MESSAGES

[75] Inventors: Stuart S. Kreitzer, Coral Springs; JoséE. Sanchez, Boynton Beach; Kenneth Charles Elkin, Lake Worth, all of Fla.

[73] Assignee: Motorola, Inc., Schaumburg, Ill.

[21] Appl. No.: 829,299

[22] Filed: Mar. 31, 1997

[51] Int. Cl.$^6$ .................................................... H04Q 7/00
[52] U.S. Cl. ................... 370/310; 340/895.44; 455/38.4
[58] Field of Search .................... 370/310, 313, 370/390, 312; 340/825.44, 825.48, 825.22; 455/38.2, 38.3, 38.4

[56] References Cited

U.S. PATENT DOCUMENTS

| | | | |
|---|---|---|---|
| 4,682,165 | 7/1987 | Davis . | |
| 4,994,797 | 2/1991 | Breeden | 340/825.44 |
| 5,182,553 | 1/1993 | Kung | 340/825.44 |
| 5,384,565 | 1/1995 | Cannon | 340/825.44 |
| 5,493,284 | 2/1996 | Kondo | 340/825.44 |
| 5,729,209 | 3/1998 | Motohashi | 340/825.44 |

Primary Examiner—Ajit Patel
Attorney, Agent, or Firm—John H. Moore

[57] ABSTRACT

In a communication system that transmits diversity messages (an original message followed by one or more copies thereof), a selective call receiver (10) which receives an original message and one or more copies will display only one of the received messages and discard the others without displaying them. This is accomplished by storing in a memory (30) the identification tag of the message that was displayed and deleted. The identical identification tags carried by later copies of the same message are compared to the stored identification tag. If a match is found, this indicates that an earlier version of the received message has already been displayed and deleted, whereupon the received copy is discarded.

10 Claims, 3 Drawing Sheets

SELECTIVE CALL RECEIVER AND METHOD OF PROCESSING DIVERSITY MESSAGES

FIELD OF THE INVENTION

This invention is directed generally to selective call receivers, and particularly to the type of selective call receiver that is used in a RF (Radio Frequency) communication system using time diversity to send multiple copies of a message.

BACKGROUND OF THE INVENTION

In certain communication systems, message reception can be improved by transmitting to a targeted receiver an original message, and then later transmitting up to five successive copies of the same message. The original message and its copies are referred to as diversity messages.

The intent of such diversity transmissions is that the targeted receiver will display only a single copy of the diversity messages—either the message received with the fewest (or no) errors, or a corrected copy in which the diversity messages are combined to remove as many errors as possible. The transmission, reception and correction of diversity messages generally occur within a very short period of time.

A problem with transmitting diversity messages can arise where the time between successive transmissions is relatively long. In satellite messaging systems, for example, there can be a time lapse of up to thirty minutes between successive diversity transmissions (i.e., between successive transmissions of the same message).

Consider the situation where the satellite messaging system transmits diversity messages, and the targeted receiver decodes the first copy of the message without error. The user then promptly displays that message and then deletes it. When the receiver subsequently receives an additional copy of the same message, it can interpret that additional copy as a new message, in which case it will alert the user that a new message has arrived. Upon displaying the message, the user will see another copy of the message that he previously read and deleted. This is objectionable to the user, and it can be particularly annoying in messaging systems in which diversity transmissions of a single message can stretch to over an hour in duration.

DESCRIPTION OF THE PREFERRED EMBODIMENT

Figure 1:
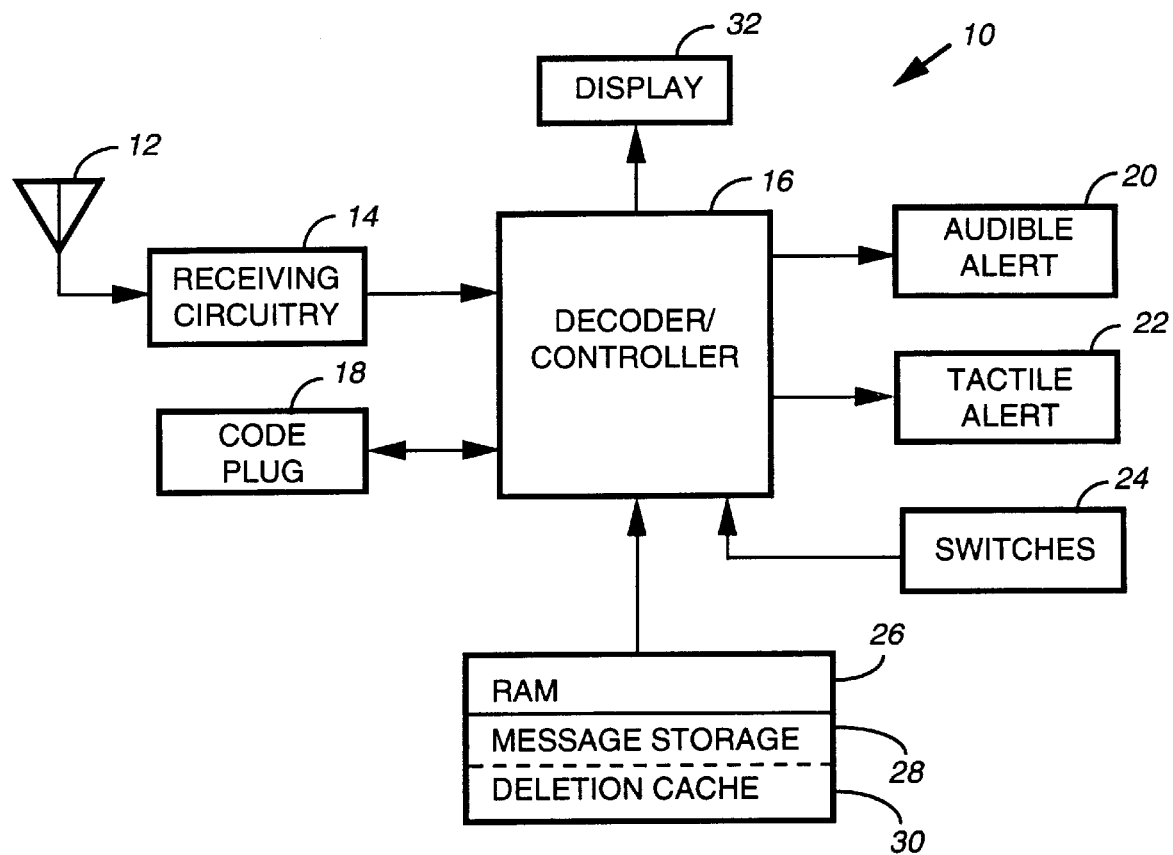
FIG. 1 is a block diagram of a selective call receiver constructed in accordance with the invention.

A selective call receiver 10 that operates in accordance with the invention is shown in FIG. 1. The illustrated components of the selective call receiver 10 are conventional, except for the novel programming that is used in the decoder/controller and the use of memory that enables the selective call receiver 10 to operate in accordance with the invention.

The selective call receiver 10 includes an antenna 12 for intercepting transmitted RF signals which are coupled to the input of receiving circuitry 14. The RF signals are preferably selective call message signals which provide, for example, a receiver address and an associated message, such as a numeric or alphanumeric message transmitted by an orbiting satellite transmitter.

The receiving circuitry 14 processes the RF signal and produces at its output a demodulated data stream representative of the information in the transmitted message. The demodulated data stream is coupled to the input of a decoder/controller 16 which decodes and otherwise processes the demodulated data in a manner well known in the art.

For purposes of this discussion, it will be assumed that the signaling format is the one described in U.S. application Ser. No. 8/317,083, entitled Satellite Based Cellular Messaging System and Method of Operation Thereof, filed Oct. 3, 1994, the teachings of which are incorporated herein by this reference. Other signaling formats may also be used. When the address is received by the decoder/controller 16, the received address is compared with one or more addresses stored in a code plug (memory) 18, and when a match is found, an alert signal is generated to alert a user that a selective call message has been received. The alert signal can be directed to an audible alerting device 20 for generating an audible alert or to a tactile alerting device 22 for generating a silent vibrating alert. Switches 24 allow the user of the selective call receiver 10 to, among other things, select between the audible alert 20 and the tactile alert 22 in a manner will known in the art.

The message information which is received is stored in a portion of a RAM (Random Access Memory) 26 designated as message storage 28. These stored messages can be displayed using one or more of the switches 24 which provide such additional functions as reset, read, delete, etc. Specifically, by the use of appropriate functions provided by the switches 24, the stored message is recovered from memory and processed by the decoder/controller 16 for displaying by a display 32 so that the user can read the message.

Another portion of the RAM 26 is designated as a deletion cache 30. It stores certain message identification tags under the control of the decoder/controller 16. The storage of these identification tags in the deletion cache 30 (or in any other suitable memory) is part of the present process that ensures that copies of messages that have already been read and deleted are not displayed again as new messages.

The decoder/controller 16 may be a conventional microprocessor, such as a 68HC11 made by Motorola, Inc.

The decoder/controller 16 is programmed in a conventional manner to decode incoming messages and to control the operation of the other components of the selective call receiver 10. It is also programmed to cause the selective call receiver 10 to operate in accordance with the invention in its processing of diversity messages.

As used herein, the term "diversity messages" means a group of identical messages, including an original message that is transmitted first, and one or more copies of the original message that are transmitted later. An original message and all its copies bear the same identification tag or sequence number. These identical identification tags are used by the decoder/controller 16 to avoid displaying multiple copies of the same message, even where there is a substantial delay between receipt of successive copies of the same message.

For purposes of example, it will be assumed that an original message is received. When the selective call receiver 10 receives the message, the decoder/controller 16 determines whether it is an original message by examining its identification tag. A message bearing a new identification tag is indicative of an original message. The decoder/controller also conventionally examines the received message for errors. If the received message does not contain errors, the user is alerted and the received message is displayed, either automatically or in response to the user's request, made known by manipulation of switches 24.

After displaying the received message, the user may elect to delete it, again by use of switches 24. In response, the decoder/controller 16 causes the message to be deleted from message storage 28, and causes the identification tag of the same message to be stored in the deletion cache 30.

Subsequently, a copy of the deleted message is received by the selective call receiver 10. The decoder/controller 16 causes the identification tag of the copy to be compared to the identification tag (previously stored in cache 30) of the deleted original message. If a match is found, this indicates that the most recently received message is a copy of the message that was previously displayed and deleted. The decoder/controller 16 then causes the copy to be deleted without displaying it and, preferably, without alerting the user. Consequently, the user is not bothered with an unnecessary alert each time a copy is received.

If a received original message has errors, an attempt is made to correct the errors, the corrected message is stored, and the decoder/controller 16 awaits the receipt of a copy. When the copy is received, the decoder/controller 16 determines whether the copy and the corrected original message can be combined to form a corrected message that has no or fewer errors. If such a corrected message can be formed, the decoder/controller 16 generates the corrected message, the user is alerted, and the corrected message is available for display. If the user then deletes the corrected message, its identification tag is stored in deletion cache 30. Subsequent copies are treated as described above and deleted without being displayed. The way in which the decoder/controller 16 is programmed to accomplish this and related results is shown in the flowcharts of FIGS. 2 and 3.

Figure 2:
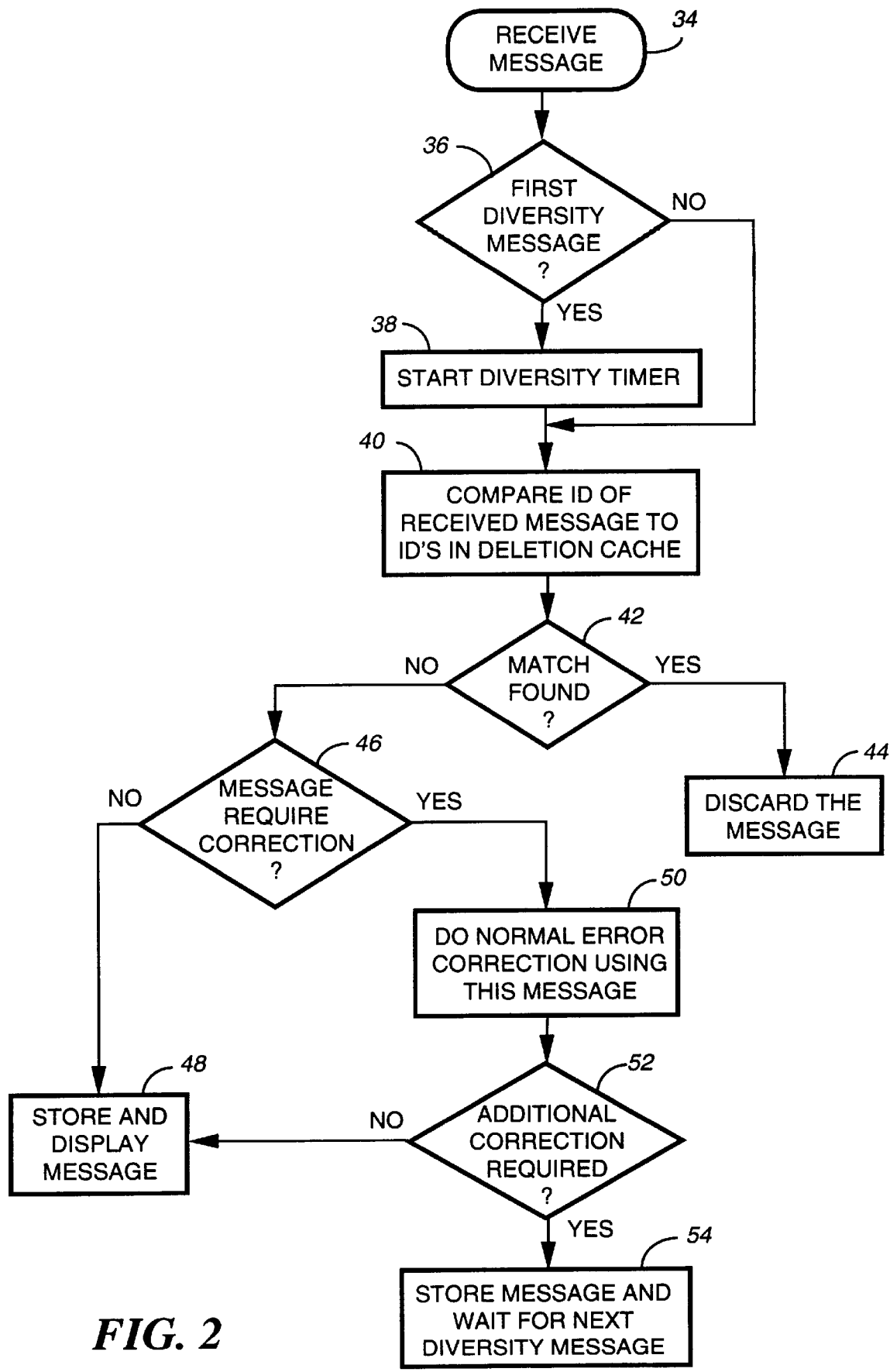
FIGS. 2 and 3 are flow charts showing how the decoder/controller of FIG. 1 is programmed to operate in accordance with the invention.
Figure 3:
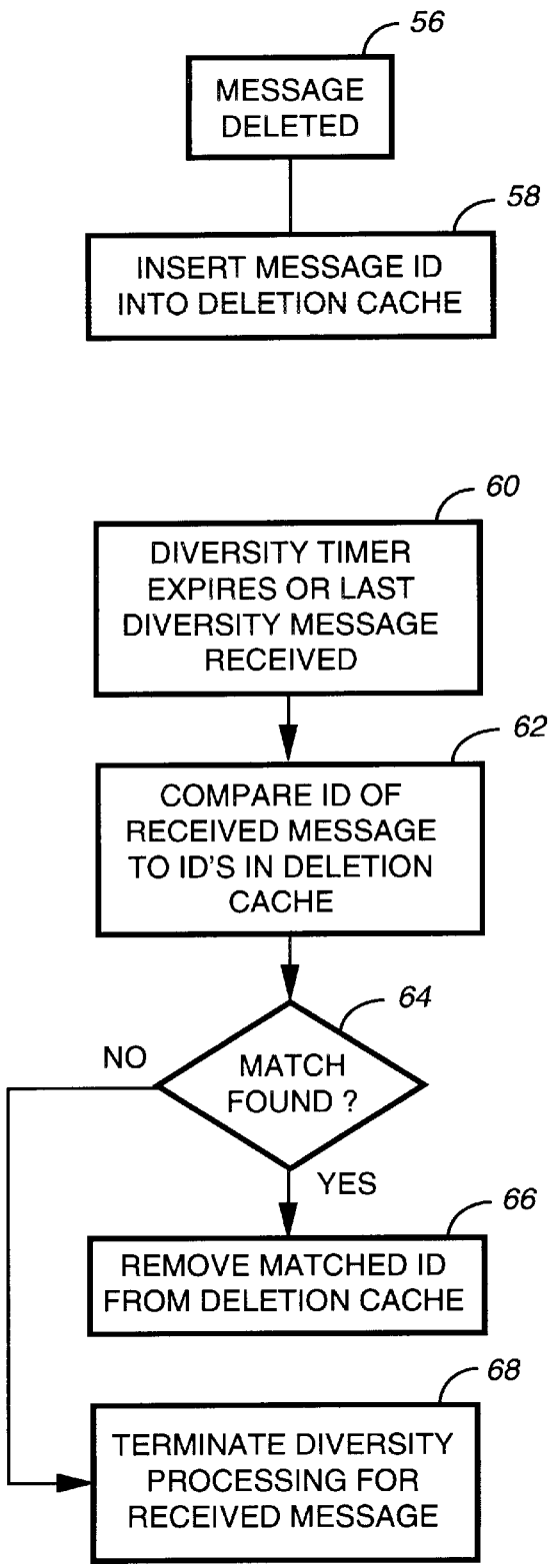

Referring first to FIG. 2, the selective call receiver 10 receives an incoming message at step 34. It is necessary to know whether this received message is the first (original) of a group of diversity messages, or a copy of a message sent earlier. Consequently, step 36 asks whether the message received in step 34 is a first (original) diversity message. If it is, the process continues to step 38 for starting a diversity timer. This is a conventional software timer that measures elapsed time following receipt of an original message. Its function is described later.

If step 36 determined that the received message was not a first diversity message that was received, the process skips step 38 and proceeds to step 40. At this point, the identification tag of the message received in step 34 is compared to all identification tags stored in deletion cache 30. If a match is found, this means that the message received in step 34 is a copy of an earlier message that has been received and deleted. Consequently, the received message is deleted (step 44) without displaying it and without alerting the user.

If no match is found at step 42, the process proceeds to step 46 to determine whether the received message requires correction. If no correction is required, the received message is stored in message storage 28 and is displayed (step 48) at the request of the user.

If the received message is found to have an excessive number of errors at step 46, conventional error correction is applied to the message (step 50). If no additional correction is required (step 52), the corrected message is stored and displayed (step 48). If additional correction is required, the process proceeds from step 52 to step 54 for storing the message and waiting for the next diversity message, i.e., the next copy of the received message. When the next copy is received, it can be displayed if no correction is required, or it can be used with the previously received message to construct a corrected message which will be stored and displayed.

There are two other processes or subroutines that run in parallel with the process shown in FIG. 2. Both are shown in FIG. 3. The first is a short process that includes steps 56 and 58. Step 56 indicates that a received message has been deleted after having been read by the user. Per step 58, the identification tag of the deleted message is inserted into the deletion cache 30. Thus, if a copy of that deleted message is subsequently received, step 42 (FIG. 2) will confirm that fact and the received copy will be discarded (step 44).

The other process shown in FIG. 3 is for removing stale identification tags from the deletion cache 30. This becomes necessary because many communication systems reuse identification tags on a relatively frequent basis, thus creating the potential for erroneously finding a match when step 42 (FIG. 2) is executed. This potential problem is avoided in the preferred embodiment by removing from the deletion cache 30 the identification tag of any deleted original message after a predetermined time has elapsed following receipt of the deleted original message.

This process starts with step 60 to determine whether the diversity timer has expired (it was started in step 38; the receipt of each original message starts its own diversity timer running), or whether the last diversity message was received. Each communication system will normally have an upper limit on the time which elapses between the transmission of an original message and the transmission of the last copy of that original message. If that limit is 30 minutes, for example, then the diversity timer will be set to expire 30 minutes after receipt of an original message. When that occurs, the identification tag of a received message (the message which started the diversity timer in step 38) is compared to identification tags stored in the deletion cache 30 (step 62). If a match is found (step 64), the matched identification tag is removed from the deletion cache (step 66). If no match is found per step 64, diversity processing for the received message is terminated. This means that error correction for the received message is terminated and all state variables in the error correction software are reset.

There is a maximum number of copies (e.g. 3) sent for each group of diversity messages. By counting the number of received messages having the same identification tag, the selective call receiver 10 determines when the last message of a group has been received. When this determination is made (step 60), steps 62–68 are executed as described above in order to remove stale identification tags from the diversity cache 30. Consequently, the reuse of identification tags does not result in erroneous operation of the process shown in FIG. 2.

It will be appreciated that the present selective call receiver and its method of operation eliminate the annoyance associated with receiving and displaying duplicate messages in a system that transmits diversity messages. The invention is particularly useful in satellite communication systems in which a relatively long period of time can elapse between the transmission of a message and the subsequent transmission of a copy.

Although the invention has been described in terms of a preferred embodiment, it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a selective call receiver capable of operating in an RF communication system which transmits original messages and one or more copies of each original message, wherein each original message and its copies have an identification tag that is common to all of them, a method of processing incoming messages, comprising:

a) receiving and displaying an original message;

b) deleting the original message and storing the identification tag of the original message;

c) receiving a copy of the original message;

d) comparing the identification tag of the copy to the identification tag of the original message; and e) if a match is found in step d), deleting the copy without displaying it.

2. A method as set forth in claim 1 wherein the identification tag is stored in a deletion cache, and further including removing the identification tag from the deletion cache within a predetermined time following receipt of the original message.

3. A method as set forth in claim 2 including starting a timer upon receipt of the original message, and wherein the identification tag is removed from the deletion cache when the timer reaches the predetermined time.

4. A method as set forth in claim 1 wherein the RF communication system transmits a predetermined number of copies of an original message, including a last copy, wherein the selective call receiver includes a deletion cache in which the identification tag is stored, and further including:

detecting when the last copy of the original message has been received; and removing from the deletion cache the identification tag of the original message.

5. A method as set forth in claim 1 wherein if the original message has errors requiring correction, further including:

storing the original message and waiting for a copy thereof; and when the copy is received, generating a corrected message and displaying the corrected message.

6. In a selective call receiver capable of operating in an RF communication system which transmits diversity messages, including an original message and one or more duplicate messages, wherein each original message and its duplicate messages have an identification tag that is common to all of them, a method of processing incoming messages, comprising:

a) receiving and displaying a first message;

b) deleting the first message and storing the identification tag of the first message in a deletion cache;

c) receiving a duplicate message;

d) comparing the identification tag of the duplicate message to the identification tag of the first message;

e) if a match is found in step d), deleting the duplicate message without displaying it; and f) removing the identification tag from the deletion cache within a predetermined time following receipt of the first message.

7. A method as set forth in claim 6 wherein the RF communication system transmits a predetermined number of duplicate messages, including a last duplicate message, and further including:

detecting when the last duplicate message has been received; and removing from the deletion cache any previously stored identification tag that corresponds to the identification tag of the last duplicate message.

8. A selective call receiver capable of operating in an RF communication system which transmits original messages and one or more copies of each original message, wherein each original message and its copies have an identification tag that is common to all of them, comprising:

circuitry for receiving an original message and copies thereof;

a display;

a memory for storing received messages and identification tags; and a controller coupled to the circuitry, the display and to the memory and programmed:

to cause a received original message to appear on the display;

to delete the received original message in response to a user's request, and to store in the memory the identification tag of the received original message; and when a copy of the original message is received, to compare the identification tag of the copy to the identification tag of the received original message, and if a match is found, to delete the copy without displaying it.

9. A selective call receiver as set forth in claim 8 wherein the controller is programmed to delete the identification tag from the memory within a predetermined time following receipt of the original message.

10. A selective call receiver as set forth in claim 8 wherein the RF communication system transmits a predetermined number of copies of an original message, including a last copy, and wherein the controller is programmed:

to detect receipt of the last copy of the original message, and to remove from the memory the identification tag of the original message.

* * * * *